INVENTORS
DANIEL F. COMSTOCK JR.
DAVID L. RICHARDSON
BY
Robert J. Schiller
ATTORNEY United States Patent Office 3,439,985
Patented Apr. 22, 1969

3,439,985
PYROMETRIC DEVICE
Daniel F. Comstock, Jr., and David L. Richardson, Lexington, Mass., assignors to Arthur D. Little, Inc., Cambridge, Mass., a corporation of Massachusetts
Filed Oct. 15, 1965, Ser. No. 496,277
Int. Cl. G01j 5/48
U.S. Cl. 356—43                                 11 Claims

ABSTRACT OF THE DISCLOSURE

A pyrometric system for determining spectral reflectance of opaque materials at high temperatures, in which a first elliptical mirror is positioned to image a high temperature source into a plane reflector and a second elliptical mirror is positoined to image the source image to a focus at which the opaque material can be placed. The plane reflector includes a small aperture and a chopper is positioned to chop periodically the light path between the first elliptical mirror and the plane reflector. A third mirror is positioned to image to a detector only light directed from the first mirror through the aperture. Similarly, a fourth mirror images to the detector only light directed by the second mirror through the aperture. Means can be used to determine which of the third or fourth mirrors will illuminate the detector and the timing thereof.

This invention relates to pyrometry, and more particularly to the determination of spectral reflectance of opaque materials at high temperatures.

The emittance of a material can be defined as its ability to radiate compared to the ability of a blackbody at the same temperature and under the same conditions. Absorptance is defined similarly.

The absorptance and emittance of a material at high temperature are of interest because from these parameters one can often determine the ultimate temperature which a material will reach when exposed to a source of heat. For example, the material may be a nose cone exposed to hot gascap radiation during reentry, a similar exposure of a material in a nozzle or rocket engine, or exposure to solar radiation. The temperature the material reaches is often critical to its life or to the safety and/or proper functioning of the payload.

The temperature a material reaches when exposed to a source of heat is determined by the heat balance, i.e., the heat input to the material and the heat output from the material. The heat input consists of radiation from the source plus gaseous conduction and convection components. The heat output from the material consists of radiation from the sample face to space plus conduction back into the solid material. The material usually is not isothermal, but often is comprised of a hot surface on a cold or cooler substrate. The surface may be ablating at the same time.

For many materials and in many situations the radiation terms, both input and output, predominate, in which case the radiation terms alone determine the surface temperature. In other cases the gaseous and solid conduction components are important also.

The radiation terms necessary to solve the heat balance problem, neglecting convection and conduction, are the radiant heat input and the radiant heat output. The radiant heat input is determined by two quantities; the characteristics of the source, considered to be known (i.e., the effective radiancy of the source at every wavelength at which the source radiates significantly), and by the absorptance of the sample material to this radiation. The total absorptance to this radiation is predicted by integrating the spectral absorptance at each wavelength over the entire significant wavelength band. For example, in the case of Mars entry, it is believed that the gascap will consist of a mixture of discrete and continuous radiation peaked somewhere near 0.3 micron. Therefore to predict behavoir of the nose cone, the absorptance of the nose cone material will have to be known at 0.3 micron and at all wavelengths out into the wavelength tails on either side of 0.3 micron. On the basis of this data the total radiant power absorbed by the material from the gascap can be predicted.

In almost all cases of interest the source delivers radiation from all directions to any given unit area on the surface. Thus the source is a hemispherical source and the required quantity is the hemispherical absorptance, $\alpha$, of the sample. An exception is the case of predicting solar heat balance for which the input radiation arrives at one angle and for which absorptance at a particular angle or set of angles is required.

The radiant heat output from the sample is determined by the temperature of the sample and by its emittance in all directions and summed over all wavelengths at which the sample emits significantly; i.e., hemispherical total emittance, $\epsilon$. Both $\alpha$ and $\epsilon$ are functions, usually weak functions, of temperature and thus must be determined at or near the temperature of interest.

There are several methods of measuring hemispherical spectral absorptance and hemispherical total emittance, reported extensively in the literature. Briefly there are the methods based on emitted radiation from the sample and those based on reflected radiation from the sample. The emission methods include use of a reference blackbody cavity integral with the sample or external to it, or rotating samples. These methods are suitable at moderate temperature or with materials that are good thermal conductors, such as metals. However, with low thermal conductivity materials and with all materials at high temperatures, heat is radiated from the sample at a high rate not readily supplied by conductive processes within the sample. As a result, gradients develop within the sample giving rise to errors of measurement. The type and magnitude of error depend on the method, but significant error is present with all the emission methods at high temperature.

It is at this point that the reflectance methods become useful. There are a variety of reflectance methods all based on the fact that if radiation from an external source is incident on a sample of the fraction of radiation reflected by the hot surface, its reflectance, $\sigma$, is a direct measure of the sample's absorptance to the same radiation, and also by Kirchhoff's law is a direct measure of the sample's emittance.

A pyrometer employing reflectance methods for determining the temperature of a hot body is typified by the device disclosed in U.S. Patent No. 3,157,728 issued Nov. 17, 1964, to D. F. Comstock, Jr.

A principal object of the present invention is to provide an improved high temperature emittance determination device.

Other objects of the present invention are to provide a novel pyrometer for use with an arc-imaging furnace to determine high temperature emittances; to provide such a pyrometer-furnace combination adapted for general purpose absorptance and emittance determination and operable over a wide range of wavelengths, temperatures and materials; to provide such a pyrometer-furnace combination in which hemispherical absorptance and emittance can be measured directly with respect to any solid opaque material; and to provide such a pyrometer-furnace combination whereby spectral absorptance and emittance at any selected angle with respect to the face of a sample can be measured.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

To effect the foregoing and other objects, the pyrometer of the present invention generally is an apparatus for measuring spectral reflectance of a sample of material (opaque to the range of wavelengths being measured) which is alternately exposed and shielded from a source of radiant energy flux. This apparatus broadly comprises radiant energy detecting means, reflective means for forming an image from substantially hemispherical radiation coming from the sample, and means for non-refractively transmitting radiation to the detecting means (1) from only the sample image during a portion of a first period of exposure of the sample to the energy flux, (2) from only the source during another portion of the first period of exposure, and (3) from only the sample image during a second period contiguous with the first period and when the sample is shielded from the source. The term "non-refractively" as used herein, is intended to be interpreted as excluding transmission of radiation through refractive elements, but not as excluding radiation transmission through gases, vapors, or vacuum, thereby indicating that the optical path from image, or source, as the case may be, to the detecting means, is unimpeded by such devices as light pipes, lenses or the like.

Because the transmission paths of the pyrometer of the invention are non-refractive, the device is freed from the wavelength limitations imposed by the elements of refractive systems.

In one embodiment, the pyrometer also includes means for selectively limiting the radiation transmitted from the sample to only radiation leaving the sample within a predetermined range of solid angles. This permits the pyrometer of the invention to determine angular emittance as well as hemispherical emittance. In general, for certain materials such as refractory oxides that obey Lambert's law (diffuse emitters) a hemispherical measurement is sufficient to supply complete information on the sample. On the other hand, the emittance from the surface of other materials, such as metals, varies substantially and often in an unknown fashion according to its angle with the surface. In such cases, it is important to measure emittance at a number of angles, such as from normal to grazing inasmuch as normal emittance alone is not sufficient for use in heat-balance determination.

Figure 1:
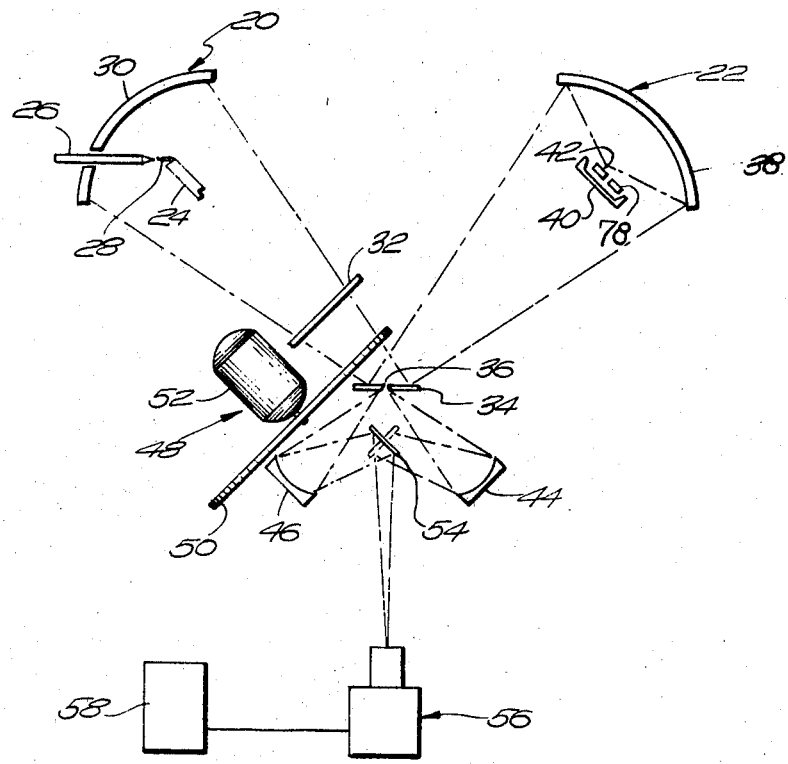
FIG. 1 is a schematic drawing of a pyrometer system embodying the principles of the present invention.

Referring now to the drawing, there is shown in FIG. 1 a schematic embodiment of the principles of the present invention including arc-imaging system 20 and re-imaging system 22. Arc-imaging system 20 comprises arc-forming means such as the usual arc anode and cathode, 24 and 26, respectively adapted to be coupled to a source of electrical power for forming and sustaining arc 28 between the electrodes. The electrodes are positioned by any one of a number of known devices (not shown) so that arc 28 will occur substantially at the principal focus of ellipsoidal reflector or mirror 30. Other sources such as a xenon lamp may be used in place of the arc.

Preferably associated with the arc-imaging system is means, shown generally at 32, comprising one or more flux attenuation screens or filters for controlling the flux intensity of radiation directed by mirror 30. At or adjacent the intermediate focal point of mirror 30 is positioned substantially plane reflector 34 having an aperture 36 therethrough. Reflector 34 advantageously is in the form of an optically polished, water-cooled metal mirror, and is positioned at an angle, preferably 45°, to the optical axis of mirror 30.

Re-imaging system 22 comprises a second ellipsoidal reflector or mirror 38, preferably identical to mirror 30, positioned with its optical axis at an angle, such as 45°, to the plane of reflector 34 and at right angles to and with the optical axis of mirror 30. The intermediate focal point of mirror 38 is preferably at reflector 34. Means, such as crucible 40, is provided for holding a specimen or sample 42 of material being tested at the principal focus of mirror 38.

It will be seen that radiation provided by arc 28 will be collected and focused by mirror 30 upon reflector 34 after attention, if any, by filters 32. Reflector 34 directs this radiation to mirror 38 which focuses the radiant energy upon sample 42, typical radiant rays passing between the principal foci of the two ellipsoidal mirrors being shown in broken lines. Basically, the elements thus described constitute an arc-imaging furnace employing the principles, for example of the furnace shown in U.S. Patent No. 3,103,574 of F. F. Chellis et al.

However, the plane reflector 34 constitutes a portion of the pyrometer of the present invention, and it will be seen aperture 36 is positioned to pass a proportion or sample of radiant energy from mirror 38. Radiation from the latter is derived from two sources (radiant energy emitted by the heated sample 42 and radiant energy reflected from the sample) and is substantially hemispherically radiated from a central portion of sample 42.

Means are provided for collecting radiant energy from arc 28 and sample 42, for sampling this energy or separating it into discrete components, and for directing the samplings upon detecting means. As means for collecting a portion of the radiant energy from arc 28, there is provided focusing reflector 44, typically spherical or the like. Reflector 44 is positioned to intercept radiation passing through aperture 36 from mirror 30, and to direct the intercepted radiation to one side of the optical axis of reflector 44. Similarly, as means for collecting radiant energy from sample 42, there is provided focusing reflector 46. The latter is positioned to intercept radiation passing through aperture 36 from mirror 38, and to direct the intercepted radiation to one side of the optical axis of reflector 46 and along a path intersecting the path of radiation reflected from reflector 44.

Figure 3A:
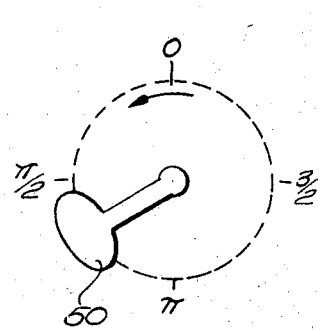
FIGS. 3A, 3B and 3C are schematic diagrams showing portions of FIG. 1 in plan view and their synchronized relation to one another.

In order to sample, in a predetermined sequence, the radiant energy collected by reflectors 44 and 46, the invention includes means for periodically and sequentially providing radiation at the intersection of the paths of reflection from reflectors 44 and 46 derived from only (1) sample 42 unilluminated by radiation provided from arc 28, (2) or from only the sample as illuminated or heated by radiation provided from the arc, and (3) from the arc alone. To this end, the pyrometer device of the invention includes a shutter system comprising means, such as chopper 48, disposed for periodically intercepting or interrupting the radiant flux directed by mirror 30 toward reflector 34. Chopper 48 is shown as single paddle shutter 50 illustrated in FIG. 3A, rotatably mounted on a shaft driven by motor 52 so as to be movable in and out of the path of radiation between mirror 30 and reflector 34. Disposed at the intersection of reflected beams from reflectors 44 and 46 is an oscillatable reflector or mirror 54 driven by another motor (not shown) between a pair of positions at which they reflected beams from reflectors 44 and 46 can be alternately redirected along a substantially common path to light detection means 56. The latter is disposed at a common focus of reflectors 44 and 46.

In a preferred embodiment, detection means 56 is a monochrometer, for example of the type commercially available under the trade designation of Model 98 from the Perkin-Elmer Corporation of Norwalk, Connecticut and described in Bulletin 109 of that company. This is basically a device for scanning a spectral range and photoelectrically or bolometrically providing signals proportional to the intensities of the various wavelengths within the range scanned. Auxiliary apparatus 58, for example a cathode ray oscilloscope, a recording galvanometer, or the like, connected in known manner to provide a visible record of the output signals from detection means 56, is also preferably included.

Figure 2:
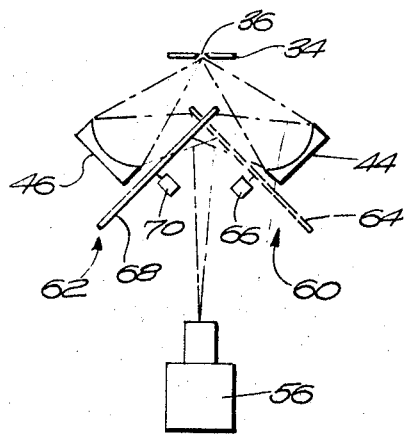
FIG. 2 is a schematic drawing showing an alternative structure for part of the system of FIG. 1.
Figure 3B:
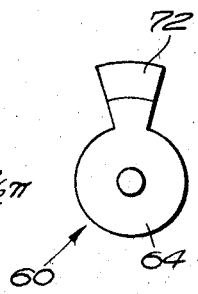
Figure 3C:
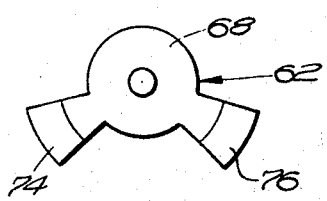

As shown in FIG. 2, in place of the oscillable reflector of FIG. 1, the shutter system of the device includes a pair of choppers 60 and 62. Chopper 60 comprise rotatable disc 64 driven by motor 66; chopper 62 comprises rotatable disc 68 driven by motor 70. As shown in FIG. 3B, disc 64 includes a single peripheral arm 72 extending radially outward from the disc periphery and having a reflective surface. Disc 68, shown in FIG. 3C includes a pair of peripheral arms 74 and 76 extending radially outward from the disc periphery and spaced angularly from one another. Choppers 60 and 62 are positioned such that on rotation of discs 64 and 68, their reflective surfaces respectively intersect the paths of light reflected by reflectors 46 and 44 and redirect that light to a common focus at detection means 56. It will be apparent that in the modification shown in FIG. 2, reflectors 44 and 46 are disposed such that beams reflected therefrom need not intersect but each may independently direct its beam toward the reflective surfaces of a respective one of discs 64 and 68. Known means (not shown) are preferably provided for synchronizing operation of choppers 60 and 62 (or mirror 54 as the case may be) with chopper 48 as described hereinafter. Alternatively, synchronization can be done by hand operation, albeit slowly.

In operating the embodiment of FIG. 1, sample 42 to be measured is placed in crucible 40, and can be surrounded if desired with a controlled atmosphere, for example of argon or the like. Arc 28 is struck, and radiant energy directed upon sample 42 is adjusted by varying, for example, the degree of attenuation provided by filters 32 until the desired temperature level is reached for sample 42. Upon achieving stable operating conditions, detection means 56 and recorder 58 can be activated. Preferably crucible 40 may also contain a water-cooled standard reflectance block 78, and in such instance, remote actuator means (not shown) should be provided for periodically and briefly positioning block 78 at the arc image position or focus of mirror 38 in place of sample 42. The latter should be removed from the arc image only briefly to avoid unnecessary overall cooling of the sample.

With sample 42 at the focus of mirror 38, the shutter system of the device is activated. As will be apparent from FIG. 3, for each rotation of paddle 50 at uniform speed, there will be an interval, proportional to the angular width of the paddle, during which radiation from arc 28 is cut-off from reflectors 34 and 44 and from mirror 38. During this interval, only emitted radiation from sample 42, without any reflected component, is directed by mirror 38 to reflector 46. Also during this interval, the movement of mirror 54 is synchronized so that it is in a first position wherein light from reflector 46 is redirected to detector 56. Thus, for that interval, the detector receives only light in the form of approximately hemispherical radiation emitted by the sample which itself during that interval, of course, receives no radiation from the arc.

Now, as paddle 50 moves out of the path of radiation from mirror 30 to reflector 34, the sample is again exposed to radiant energy from arc 28, and if mirror 54 remains in its first position, light will be reflected coming from mirror 38 and reflector 46 and will thereby be redirected toward detector 56. This light will contain both emitted and reflected radiation from sample 42. Of course, because mirror 54 in its first position only reflects light coming from reflector 46, no arc light coming from reflector 44 will be directed to detector 56.

Lastly, with paddle 50 not obstructing the radiant energy path between mirror 30 and reflector 34, and with mirror 54 oscillated to its second position, only light coming from reflector 44 is directed to detector 56. Obviously then, the detector receives no radiation from the sample.

Figure 4:
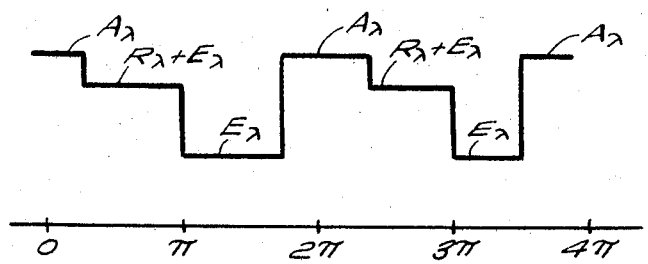
FIG. 4 is a plot illustrating an exemplary output of the detector of the apparatus of FIG. 2 when the latter is operating.

With reference to both FIGS. 3 and 4, if the rotation of paddle 50 is described in radians and known means (not shown) synchronize the shutter system so that paddle 50 intersects the path of light from mirror 30 only at a $3\pi/2$ position, so that mirror 54 is in its first position when paddle 50 is at its $\pi/2$ and $3\pi/2$ positions and that mirror 54 is in its second position when paddle 50 is at its zero position, then a representative detector output appearing on recording apparatus 58 for a predetermined wavelength, $\lambda$, is as shown in FIG. 4. The height of each step of the waveform shown is exemplary only for purposes of illustration and the relative intensities are indicated by the reference characters of which $A\lambda$, $R\lambda$, and $E\lambda$ respectively refer to the intensities received at wave-length $\lambda$ from the arc beam only, the reflected-only radiation from sample 42, and the emitted-only radiation from sample 42.

In the embodiment of FIG. 2, choppers 60 and 62 are disposed so that the peripheral arms respectively interleave with one another at a reflection station or position preferably common to reflected beams from both reflectors 44 and 46. However, the latter reflectors can be positioned so that their reflected beams do not necessarily intersect, it being required only that the reflected beams from peripheral arms 72, 74, and 76 be directed to a common point which is the input pupil of detection means 56. Of course, the rotation of choppers 60 and 62 are synchronized to provide the desired sequence of reflections to the detection means i.e. radiation wholly from the arc, radiation emitted from the sample, and radiation both reflected and emitted from the sample. To this end, the two choppers are rotated at the same rate, the peripheral arms 74 and 76 of chopper 62 being angularly spaced 120° from one another, and chopper 60 being positioned so that peripheral arm 72 interleaves arms 74 and 76 at about 120° intervals.

Figure 5:
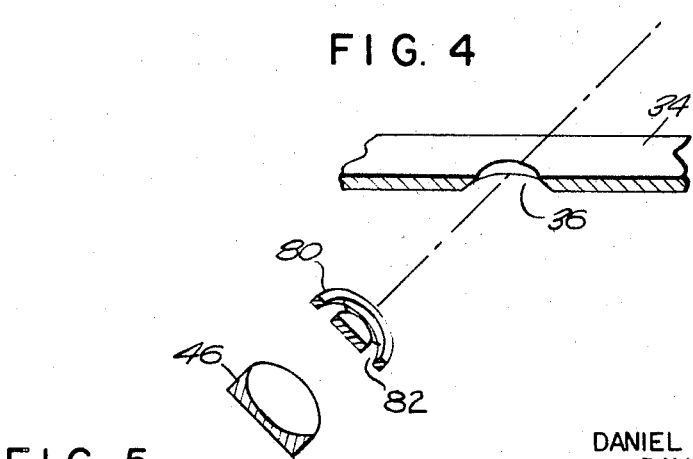
FIG. 5 is a fragmentary perspective view, partly broken, showing a modification of a system embodying the invention.

The radiation passing through aperture 36 from mirror 38 represents energy radiated from the sample at all angles i.e. hemispherical radiation. This latter may be broken down into solid angular components and to this end, the apparatus of the present invention may include, as shown in FIG. 5 opaque aperture plate 80 having an annular transparent portion 82 therein. If plate 80 is positioned, as shown in FIG. 5 to blank off all but an annular ring of radiation from mirror 38 as passed by aperture 36, then only radiation leaving the sample at a particular solid angle will be focused by mirror 46 onto the monochrometer. Aperture plate 80 must be positioned closely adjacent to the surface of mirror 46 (i.e. lie in or close to a lens plane and far removed from the image plane at aperture 36) in order to preserve and define the desired angle of radiation from the sample and be free of dependency on the shape of the image formed by mirror 38. The spacing of mirror 46 and plate 80 in FIG. 5 therefore can be seen to be exaggerated in the interests of pictorial clarity.

Because aperture 36 is located at the image plane of mirror 38, the shape of the aperture is not critical in preserving a circular cross-section to a beam of light passing therethrough. However, because reflector 34 may be jarred or otherwise positioned so that aperture 36 is to either side of the image plane of mirror 38, to insure that light passing through aperture 36 represents radiation from a small circular area on the sample, it is preferred that aperture 36 be elliptical in form, the long axis of the ellipse being directed along the line of radiation between mirrors 30 and 38. If the latter are disposed to direct light at approximately 90° to one another, and the specular surface of reflector 34 is at an angle of 45° to the major axis of both mirrors 30 and 38, then aperture 36 should be at 45° ellipse.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. Apparatus for determining spectral reflectance of a sample of opaque material, and comprising;
   a source of radiant energy flux;
   first reflective means for focusing radiation from said source along a first path;
   mirror means having a specularly reflecting surface disposed at an angle across said first path for reflecting said radiation along a second path substantially non-parallel with said first path, said mirror means having an aperture extending therethrough, intersecting said paths, and dimensioned to transmit only a minor portion of radiation from said source;
   means for periodically interrupting transmission of radiation along said first path;
   second reflective means for focusing radiation from said surface to a focus at which said sample is intended to be disposed;
   third reflective means positioned in the path of radiation transmitted directly by said second reflective means from said sample through said aperture;
   fourth reflective means positioned in the path of radiation transmitted directly by said first reflective means from said source through said aperture;
   a radiant energy detector; and
   means for alternatively directing radiation reflected by said third or fourth reflective means to said detector.

2. Apparatus as defined in claim 1 wherein said first and second reflective means are ellipsoidal mirrors, and said surface of said mirror means is substantially plane.

3. Apparatus as defined in claim 1 wherein said fourth and third reflective means are substantially spherically surfaced mirrors for directing radiation to an image plane, said detector being disposed at said image plane.

4. Apparatus as defined in claim 3, including means positioned adjacent said third reflective means for selectively limiting radiation transmitted from said sample to said third reflective means to radiation leaving said sample within a predetermined range of solid angles.

5. A pyrometer for measuring the temperature of a sample heated by a source of radiant flux directed onto said sample by an optical path including an intermediate image of said sample and substantially coextensive intermediate image of said source, said pyrometer comprising in combination;
   radiant energy detecting means;
   reflecting means having a substantially plane specular surface, disposed adjacent said images for directing said radiant flux from said source to said sample, said reflecting means having an aperture therein adjacent said images;
   means for periodically viewing only said source through said aperture and for transmitting radiant energy from said source to said detecting means;
   means for periodically viewing only said sample through said aperture and for transmitting radiant energy from said sample to said detecting means; and
   means for periodically exposing and shielding said sample to and from said flux.

6. A pyrometer for measuring the temperature of a sample heated by a source of radiant flux directed onto said sample via an optical path including an intermediate image of said sample and substantially coextensive intermediate image of said source; said pyrometer comprising in combination;
   radiant energy detecting means;
   reflecting means having a substantially plane specular surface, disposed adjacent said images for directing said radiant flux from said source to said sample, said reflecting means having an aperture therein adjacent said images;
   first reflective focusing means spaced from said aperture for reflecting energy from only said sample passing through said aperture;
   second refractive focusing means spaced from said aperture for reflecting energy from only said source passing through said aperture;
   means positioned in the reflective paths of both said focusing means for redirecting radiant energy to said detecting means; and
   means for periodically exposing and shielding said sample to and from said flux.

7. A pyrometer as defined in claim 6 wherein said means for periodically exposing and shielding comprises a chopper having a blade movably mounted for periodically intercepting the optical path of radiant flux between said source and said reflecting means.

8. A pyrometer as defined in claim 6 wherein said means for redirecting radiant energy comprises mirror means movably mounted for alternatively reflecting to a substantially common image plane energy coming from either said first or said second focusing means.

9. A pyrometer as defined in claim 8 wherein said mirror means comprises a mirror having a specularly reflecting surface and pivotally mounted for presenting said surface alternatively to said energy coming from either said first or second focusing means.

10. A pyrometer as defined in claim 8 wherein said mirror means comprises a first mirror and a second mirror, said first mirror being mounted for movement in and out of the path of energy coming from said first focusing means, said second mirror being mounted for movement in and out of the path of energy coming from said second focusing means, both mirrors being disposed when in the respective paths of energy for redirecting the latter to said image plane.

11. A pyrometer as defined in claim 6 including radiation opaque means having an annular aperture therein and disposed adjacent the reflecting surface of said first focusing means so as to limit radiation incident on the latter to that emitted within a predetermined solid angular range from the surface of said sample.

References Cited

UNITED STATES PATENTS

| | | | |
|---|---|---|---|
| 3,057,200 | 10/1962 | Wood | 73—355 |
| 3,103,574 | 9/1963 | Chellis et al. | 219—383 |
| 3,157,728 | 11/1964 | Comstock | 88—22.5 |
| 3,277,773 | 10/1966 | White | 88—14 |

RONALD L. WILBERT, *Primary Examiner.*

R. J. WEBSTER, *Assistant Examiner.*

U.S. Cl. X.R.

73—355; 250—233